United States Patent

[11] 3,631,455

[72] Inventor Roland S. Gregg, Jr.
Canoga Park, Calif.

[21] Appl. No. 798,896
[22] Filed Feb. 13, 1969
[45] Patented Dec. 28, 1971
[73] Assignee The Bunker-Ramo Corporation
Canoga Park, Calif.

[54] METHOD AND APPARATUS FOR CODE CONVERSION
20 Claims, 5 Drawing Figs.

[52] U.S. Cl. .......... 340/324 A, 340/172.5, 340/152, 340/153, 340/347 DD
[51] Int. Cl. .......... G06f 3/14
[50] Field of Search .......... 340/324.1, 347, 172.5, 324 A, 152, 153; 178/26, 26.5

[56] References Cited

UNITED STATES PATENTS

| | | | |
|---|---|---|---|
| 2,744,955 | 5/1956 | Canfora et al. | 178/26.5 UX |
| 3,016,422 | 1/1962 | Lee | 178/26.5 |
| 3,291,910 | 12/1966 | Nicklas et al. | 178/26 |
| 3,307,156 | 2/1967 | Durr | 340/172.5 |

OTHER REFERENCES

IBM Tech. Disc. Bul. Vol. 8, No. 1, June 1965, p. 76 (D. E. Fisk)

IBM Tech. Disc. Bul. Vol. 10, No. 3, August, 1967, pp. 248–252 (C. H. Propster, Jr., G. H. Royer, R. H. Terlet)

*Primary Examiner*—John W. Caldwell
*Assistant Examiner*—David L. Trafton
*Attorney*—Frederick M. Arbuckle

ABSTRACT: A system for converting codes between a system data (e.g., ASCII) code format and a video display (e.g., dot matrix) code format is disclosed for use in a data display system employing a cathode-ray tube. Conversion is accomplished one line of characters at a time by a procedure in which the character code groups to be converted (system to video or video to system) are circulated in a register in synchronism with a "dictionary" consisting of a series of all possible character code groups, each with its related code group of the other format. The circulating register for the dictionary is shorter than the register for the line of data to be converted such that with each cycle of the data circulating register, the dictionary is "precessed" (shifted) one character position in the line of data. When a correlation is found, the related code group of the other format is substituted from the dictionary into the data register. Thus, one line of data is converted in a number of cycles of the data register equal to or less than the number of different character code groups of either format in the dictionary register.

INVENTOR.
ROLAND S. GREGG, JR.

BY *Lindenberg + Freilich*

ATTORNEYS

INVENTOR.
ROLAND S. GREGG, JR.
BY Lindenberg & Freilich
ATTORNEYS

3 Sheets-Sheet 3

INVENTOR.
ROLAND S. GREGG, JR.

BY Lindenberg + Freilich

ATTORNEYS

METHOD AND APPARATUS FOR CODE CONVERSION

REFERENCE TO RELATED APPLICATION

This invention relates to the disclosure of copending application 799,265, filed Feb. 14, 1969, and now U.S. Pat. No. 3,603,966.

BACKGROUND OF THE INVENTION

This invention relates to data display systems, and in particular to a method and apparatus for conversion between a system data code and a video display code.

Virtually all commercial data display systems employ a CRT. The widespread use of the CRT for data display is attributable to the facile manner in which lines of characters may be generated to display a message. This is because the raster scan may be readily oriented across the CRT screen to display data, character by character, one line at a time, as the scanning beam is shifted down the CRT screen.

In a typical system, a specific number (N) of lines can be displayed, each line consisting of a predetermined number (X) of character positions. The data or characters to be displayed are usually stored in some type of cyclic storage device along with control codes used to synchronize the raster scan with the reading of the characters one at a time from the storage device. In that manner, the characters can be readily regenerated on the CRT screen as they are cyclically read from the display storage unit.

The character generating technique used varies with different systems. The three most commonly used techniques are: the stroke method, the monoscope method, and the dot matrix method. The dot matrix method generates the character by unblanking the beam at appropriate dot positions under control of a character video code as the beam is swept through the dot matrix under control of a synchronized sawtoothed wave generator. It should be appreciated that each such character video code normally requires a greater number of binary digits to define a character than substantially more compact codes such as the American Standard Code for Information Interchange (ASCII). Consequently, if data is stored in a compact code (such as ASCII), conversion to the video code format is necessary in order to cause the CRT to display the character. For example, data may be stored in ASCII in a file storage unit and converted to the video code format for storage in the cyclic display storage unit which controls the CRT beam blanking to produce the character. Reverse code conversion may also be necessary to transfer character data from the display storage unit to the file storage unit.

The stroke method may also require code conversion in the sense of translating a character code from one code format to another because the video code for generating a character must specify a series of strokes to be displayed by the CRT and normally will require more bits than the system data code used to define the character.

Code conversion may also be required in the monoscope method because the video code employed to generate the coordinates necessary for selection of the appropriate image on a target of the character generator may differ from the system data code.

Accordingly, although the preferred embodiment of the present invention described herein provides for efficient code conversion for transfer of data between display and data file units in a dot-matrix system, it should be understood that the invention may be employed to equal advantage in other systems, such as the stroke and monoscope systems of character display, to meet particular environment or operating requirements.

SUMMARY OF THE INVENTION

The embodiment of the invention specifically disclosed herein comprises a CRT display unit, a cyclic display storage unit, and a file storage and control unit. The latter unit receives and stores character information in a data code (e.g., ASCII) which requires a given number of binary digits to define each data character. The display storage unit receives and stores character information for display in a video code which is distinct from the data code. The display storage unit is cyclic in order that video display codes may be synchronously read in sequence, one character at a time, for display as the CRT beam sweeps through successive dot matrices. To provide for intercharacter spaces, the video code positions of a given character in the display storage unit are each followed by a specified number of bit positions to be read while the beam is blank, that number of bit positions being at least equal to the number of binary digits required to define a character in the system data code.

An entire page of data consisting of a plurality of lines of characters may be stored in the cyclic display storage unit such that in one cycle thereof, the entire page is regenerated on the CRT screen. Any character or line on display may be changed by substitution of video display code groups in the display storage unit. The entire page may be changed by changing one line at a time. To accomplish that, each character expressed in the system data code is converted to the video display code by a procedure which involves placing the line to be converted in a first recirculating register with adjacent system code groups separated by a sufficient number of bit positions to store a video code group of one character. Thus, for a given number of characters of a line of data, there will be that given number of system code groups with space for a corresponding number of video code groups. A dictionary for translating the system code groups to video code groups is similarly transferred into a second recirculating register that is shorter than the first recirculating register by space for one system data code group and its related video display code group. System data code groups of the two registers are compared as they recirculate past read heads and when a correlation is found, the following video display code group is read from the second register into the following video-code-group space in the first register. After a maximum number of cycles of the first circulation register equal to the number of different system data code groups in the second register, the entire line will have been converted from the system data code to the video display code since the dictionary in the second register "precesses" with respect to the first, thus insuring that all of the character codes in the dictionary will have been compared with each character data code to be converted. A "character" is defined as any symbol to be displayed, such as letters, numerals, punctuation marks, and even blank spaces since blank spaces do convey information in text.

Upon transferring data from the display storage unit to the file storage unit it is necessary to convert the video display code groups to system data code groups. That is accomplished in a manner similar to the data-to-video-code-conversion by transferring the line of data to be converted into the first register and copying into the second register a dictionary for converting video code groups into system code groups.

Accordingly, in the video-to-data-conversion dictionary, the video display code group of a given character precedes its corresponding system data code group. Once conversion has been completed, the converted line is transferred to a location in the file storage unit which can, for example, be specified by an operator through a keyboard unit.

It is possible for translation to be completed in less than the aforesaid maximum number of cycles of the first register. Accordingly, although it is desirable to count the number of cycles of the first register to know when the translation should be completed, another counter is incremented as each correlation is found by the comparator in order to know when conversion has actually been completed. Thus, in accordance with a further feature of the present invention, a first counter is used to terminate the converting process once all characters have been converted, while a second counter is employed in cooperation with the first counter to determine whether there is a format error since, if there have not been a sufficient number of correlations by the time the maximum number of recirculations of data in the first register have occurred, there is an error in at least one code group of a character to be translated.

In accordance with a further feature of the invention, the file storage unit comprises a plurality of cyclic memories, such as tracks on a rotating magnetic drum. One such memory will store a plurality of pages, the characters of the pages being interleaved such that the respective characters of the pages follow each other in sequence. To transfer a line of data from the file storage unit to the display storage unit, the first line of all pages is transferred from the file storage unit to the first circulating register. Once the system-to-video code converting dictionary has been loaded into the second register, the data in the first register is shifted to position the system data code groups of the selected line in the desired page for comparison with system data code groups in the second circulating register. When a correlation is found, the corresponding video code group of a given character is then transferred from the second register to the first register into the character positions of other pages which follow between the data code group of that given character and the data code group of the next character of the line being translated.

The procedure is somewhat reversed in transferring data from the data display unit to the file storage unit. The video code group of the line of data being translated is compared with the video code groups in the second register and when a correlation is found, the corresponding data code group of a given character is transferred to bit positions of the first register which correspond to the intercharacter space positions in the line of data stored therein for conversion. Once conversion of the line is complete, in the aforesaid maximum number or less circulations of the first register, the video code groups in the first register may be erased. The remaining data code groups are then aligned with the page selected of a given file into which the line of data is to be transferred. Thereafter, the assimilation of file data is accomplished by transferring the content of the corresponding lines of other pages in the selected file into the circulating register, and then transferring the assimilated data to the selected file.

In accordance with still another feature of this invention, once the code conversion has been completed for a display to file transfer, the video code groups are erased and in their place code groups consisting of a binary one in each bit position are stored therein. Thereafter, while assimilating the file data prior to storing the converted line of data in the file storage unit, the corresponding lines of other pages are not assimilated with the line of translated data in the first register if any other code group is detected in those positions for the characters of other pages. In that manner, assimilation is actually accomplished by transferring into the first register the lines of other pages of the file into which the translated data is to be stored. Since the system data code does not include a code group of all ones for any character, transferring character code groups into the first register in only those character positions having code groups consisting of all ones results in the desired assimilation. Once the assimilation has been completed, the updated file data contained in the first register is transferred back to the file storage unit.

The novel features of the invention are set forth with particularity in the appended claims. The invention will best be understood from the following description when read in conjunction with the accompanying drawings.

DESCRIPTION OF THE PREFERRED EMBODIMENT

Figure 1:
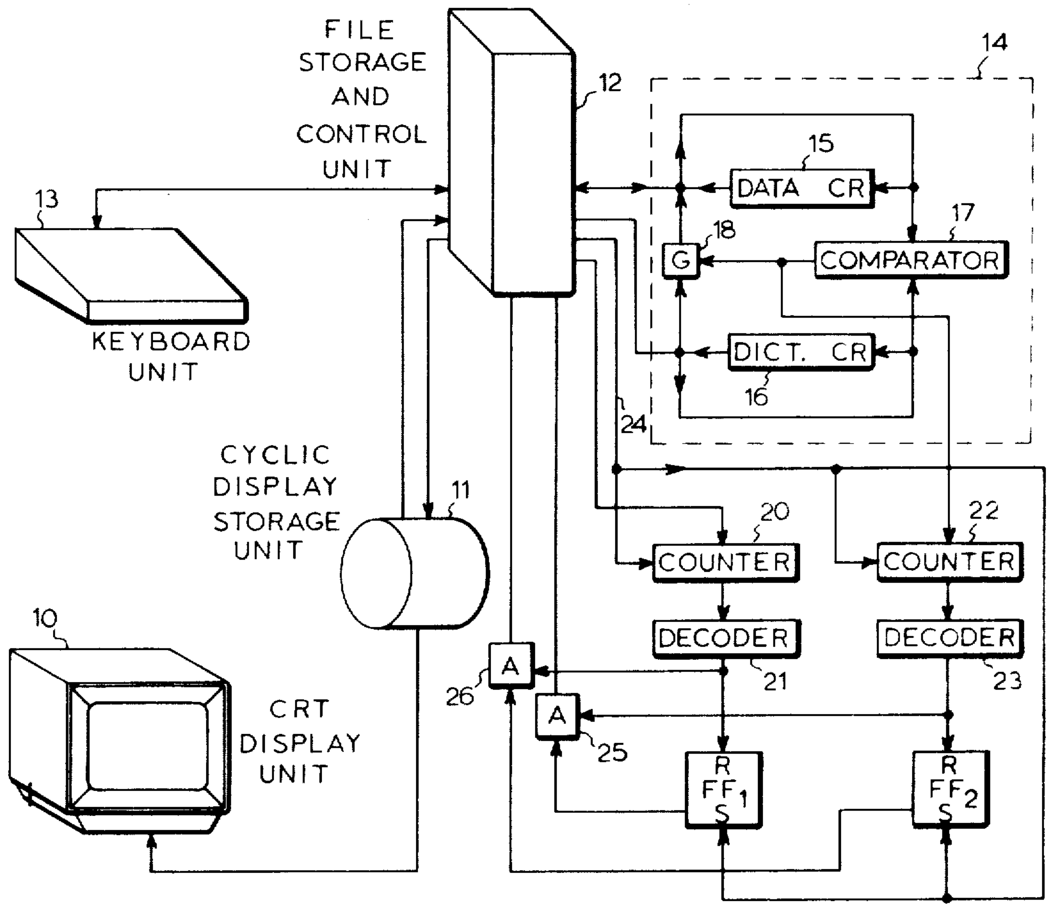
FIG. 1 is a general block diagram of a CRT data display system with a code converter in accordance with the present invention.

Referring now to FIG. 1, a CRT display unit 10 is provided with a cyclic storage display unit 11, such as a magnetic drum having a plurality of tracks from which data to be displayed is cyclically read for regeneration of characters on a CRT screen. A file storage and control unit 12 provides bulk storage of data that may be displayed. It also provides the necessary logic networks for controlling the transfer of data to the display storage unit 11 and for editing data by the selective insertion of characters, lines or even entire pages of display data. The transfer of data for display is controlled by an operator through a keyboard unit 13. The keyboard is also adapted to give the user maximum capability to arrange, manipulate, format, inspect, and edit by inserting and removing data.

Figure 2:
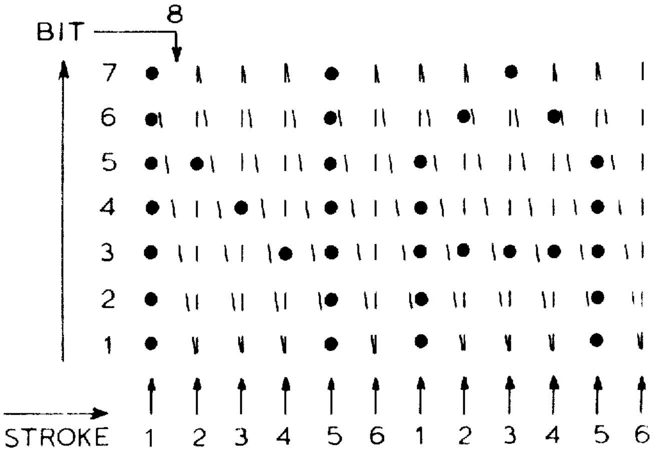
FIG. 2 illustrates an exemplary manner of producing characters on the CRT of FIG. 1 using the dot matrix method.

FIG. 2 illustrates an exemplary manner for producing characters on the CRT display unit 10 using a 5×7 dot matrix generated as the beam sweeps through six strokes for each character under the control of a sawtooth wave generator. The video code format of the data in the display storage unit 11 turns the beam on at each of seven points during a given stroke depending upon whether a binary 1 for each point is stored in the display storage unit. For example, to display the letter N the video code would have a binary 1 in each of the seven-bit positions of the first stroke. An eighth bit position is provided in the code for the first stroke but the beam is blanked during that bit time to allow the beam to return to the base of the line for the next stroke. The second stroke then includes a binary 1 in the fifth bit position only. Similarly, the video code group for the third and fourth strokes include a binary 1 in the fourth and third bit positions, respectively, while the video code for the fifth stroke is the same for the first stroke. During the sixth stroke, the beam is blanked throughout all eight bit times to provide an intercharacter space between the letter N and the letter A, as shown in FIG. 2.

It should be noted that since the CRT beam is blanked during the sixth stroke of each character position, the bit positions read during that stroke may be used to store whatever nonvideo information is desired. That information may, for example, be the corresponding system data code of the following character, if the code group for the following character consists of eight or less binary digits. In a preferred embodiment of the present invention, the ASCII code is employed. It consists of seven binary bits for each character. An eighth binary digit is added to each code group in order to provide parity checks if desired as data is transferred within the system or to an external system, such as a computer at a remote location. Accordingly, the ASCII code groups could be stored with the corresponding video code groups in the display storage unit 11. However, it is preferred to store other nonvideo code data in the sixth stroke bit positions, such as cursor signals to mark a character, line, or even the entire page for transfer or substitution. Accordingly, when a line of data is transferred to a display storage unit 11 it is necessary to convert an eight-bit data character code into a 40-bit video character code. The reverse conversion is then required upon transferring data from the cyclic display storage unit 11 to the file storage in control unit 12.

It should be understood that although the cyclic display storage unit 11 is shown separate and apart from the file storage in control unit 12, in practice, both are implemented on a single magnetic drum using a pair of drum tracks for the cyclic display storage unit 11 and a pair of drum tracks for each file of the file storage in control unit 12. The control networks for operation of the system including the cyclic display storage unit 11 are contained in the unit 12 and include a clock track and an index track for synchronization of operation. The manner in which such control may be provided will vary in different systems to satisfy different environments and operating requirements. Accordingly, the present invention will be described generally without regard to particularities of the data display system in which it is employed. However, in order that the invention be fully understood, reference will be made to a dot matrix method of character display and conversion between the ASCII code and the dot-matrix video code.

The use of two tracks for the cyclic display storage unit 11 and for each file of the file storage in control unit 12 permits a binary code group to be stored with the successive binary digits thereof distributed, the odd ones in one track and the even ones in the second track, to avoid bit density problems on a magnetic drum of small diameter. However, inasmuch as once the binary code digits are read in pairs, strobe pulses generated from a clock pulse so gate the binary digits that the odd-numbered digit precedes the even-numbered digit, the cyclic display storage unit 11 and each file of the file storage in control unit 12 may for the present invention, be regarded as comprising a single track.

A page of data consisting of 15 lines of 72 characters each is stored on the one track of the cyclic display storage unit 11 in order that the characters may be regenerated on the screen of the CRT display unit 11 at a sufficient rate to provide flicker-free display. However, only 64 positions are employed for display. The remaining eight character positions are read at the end of each line while the CRT beam retraces to the starting point for the next line or frame. The beam is, of course, blanked during those retrace periods.

Figure 3:
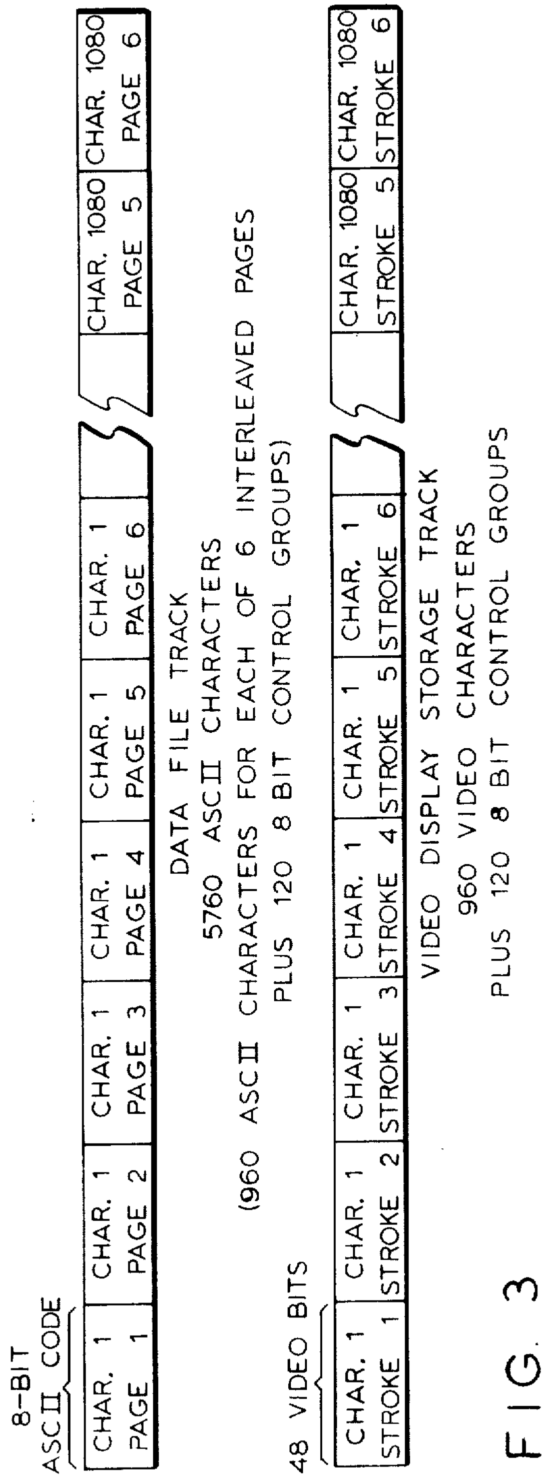
FIG. 3 is a diagram illustrating the arrangement of data in a recirculating memory employed for file storage in the system of FIG. 1 and the arrangement of data in a recirculating memory employed for display storage in the system of FIG. 1.

Since each character and its associated intercharacter space in the cyclic display storage unit 11 requires 48 bit positions for storage, and the corresponding ASCII code requires only eight bit positions in the file storage and control unit 12, six ASCII code groups may be stored on one sector of the file storage and control unit 12 equal to the sector required to store a 48-bit video code group in the display storage unit 11. Accordingly, in order to store one page of data consisting of 15 lines of 64 characters on one track of the file storage and control unit 12 while one page of data is stored on a track of equal length in the display storage unit 11, but in video code, it is possible to store six pages of data in ASCII code on a track of the file storage and control unit 12, but in an interleaved fashion so that, for example, the first bit of the second character of the first page is the 49th bit on the track. In other words, the first six character code groups read from a file track are from six separate pages as shown in FIG. 3. Accordingly, a character code group stored in the ASCII code on a file track requires only one-sixth the space of the video code stored in a track for the cyclic display storage unit 11. It should be noted that the file data tracks also have blank character positions corresponding to the character positions of the video display track read during the retrace periods between lines and frames. In that manner, the same line index and other synchronizing signals used for the display unit 11 may be used for the file storage and control unit 12.

Since file data is stored in eight-bit ASCII codes, one track may store six times as much data as the track employed for video display storage. This is so because one video character requires six eight-bit code groups for one character. Accordingly, in the space required to store 15 lines of video characters (a total of 960 characters in video code for one page of display data), the file storage unit may store 5,760 characters in the eight-bit ASCII code, or a total of six pages of file data. To facilitate transferring data between the file storage and control unit 12 and the cyclic display storage unit 11, the six pages of data are not stored in the data file track in sequence, but rather in an interleaved fashion, as shown in FIG. 3.

In order to manipulate data from one file track to another, a recirculating register (often called a "revolver") may be employed to read the data from one track, one line at a time, and store it until the file into which it is to be transferred has been addressed (by selection of a recording head) at which time the data is transferred to the line addressed by the operator through the keyboard unit 13. In practice, this is readily accomplished by constantly loading the recirculating register from the appropriate data file track until the pertinent line has been located. That line of data is then trapped in the recirculating register for transfer to another file track, as suggested, or transferred to the cyclic display storage unit 11. However, since that recirculating register then contains the data in ASCII code, and the cyclic display storage unit 11 requires the data to be in a video code, it is necessary to convert or translate the ASCII code of each character to its corresponding video code if transfer is to the display storage unit 11. That is accomplished by a code converter 14 in accordance with the present invention. The method employed is a table look-up procedure which requires that data to be converted be compared with a list of all possible characters. When correlation is found, the corresponding video code is substituted in the recirculating register for the unselected pages trapped therein. Thus, the recirculating register employed for the basic data transfer control function may be employed to store the line of data while the table look-up procedure is carried out. That recirculating register is schematically illustrated in the code converter 14 by a block 15 bearing the legend DATA CR with a feedback circuit from the output to the input thereof for recirculation of data until the data being recirculated is ready for transfer to the cyclic display storage unit 11 under the control of the file storage and control unit 12. While it is being recirculated, each character is compared against all possible characters in the dictionary being recirculated in a second register shown in the code converter 14 as a block 16 bearing the legend DICT. CR and having a feedback circuit from the output to the input terminal thereof. The outputs of the two circulating registers 15 and 16 are connected to a comparator which, upon detecting a correlation between the ASCII code of a character in the data circulating register 15 and an ASCII code of the dictionary in the circulating register 16, enables a gate 18 to transfer into the data circulating register 15 the corresponding video code into the 40 binary bit positions following the ASCII code of the character.

In order that all characters in the data circulating register 15 be compared with each ASCII code group in the dictionary circulating register, if necessary for translation, the dictionary is "precessed" with respect to the data in the circulating register 15 to continually provide new comparisons during each successive cycle of the data circulating register 15. That is automatically accomplished in accordance with the present invention by having the dictionary circulating register 16 shorter than the data circulating register 15. But first the line of data from the desired page interleaved with data of other pages is shifted until it appears in the first page position.

In the preferred embodiment, the data circulating register 15 is designed to store XP characters in ASCII code where X is the number of data characters to be displayed in one line (for example 64) plus eight unused character positions read during line and beam retrace periods, and P is the number of pages (six in the present example) interleaved on a single file track of the file storage in control unit 12, whereas the dictionary circulating register 15 stores X–1 characters in ASCII code, each ASCII character code being followed by its corresponding video code. In that manner a line of interleaved pages is trapped in the recirculating register 15 for translation by a unique table look-up procedure involving a shorter recirculating register 16.

Once all the video codes have been found and stored in the data circulating register 15, a process which requires a maximum of X–1 recirculations, or 71 recirculations for the present example, the ASCII codes are erased during a following cycle of the circulating register 15 in order that upon transfer of the translated data to the cyclic display storage unit 11 via the file storage and control unit 12, each video code group will be separated from adjacent video code groups by eight-bit positions containing binary zeros. Any nonvideo data which may be desired or required following any given video code group is then provided by the file storage and control unit 12, such as a cursor or marker of some form for editing or other control purposes. Still other nonvideo data may be stored in the eight character positions read during the beam retrace periods between lines, such as end-of-line and end-of-frame indicators.

As just noted, translation may require as many as X–1 circulations (71 circulations in the present example for a 64 character line display system), and must be complete at that time or else an error has occurred. A first counter 20 counts the number of circulations of the data circulating register 15 and a decoder 21 detects when a count of 71 has been reached. Another counter 22 counts the number of correlations while a decoder 23 detects the count of 64. Once the translation from the ASCII to the video code is ready to commence, the file storage and control unit 12 resets the counters 20 and 22 to zero and sets flip-flops $FF_1$ and $FF_2$ via line 24. Thereafter, as the data circulating register 15 increments the counter 20, correlations detected by the comparator 17 between ADCII code groups being recirculated by the two registers 15 and 16 are counted by the counter 20. If all 64 correlations have been found at the end of any recirculation up to 71, the decoder 23 transmits a signal through an AND-gate 25 to the file storage and control unit 12 to terminate the translation process and to initiate the process of erasing the remaining ASCII code groups in the data-circulating register 15.

The AND-gate 25 is enabled by the flip-flop $FF_1$ which was set when the actual translating process was initiated. If there are not 64 correlations detected by the comparator 17 by the time 71 recirculations have been counted by the counter 20, the translation process is not terminated and the erasure of ASCII code groups is not initiated because upon detecting a count of 71 the decoder 21 resets the flip-flop $FF_1$, thereby disabling the AND-gate 25. However, the flip-flop $FF_2$ remains set since a correlation count of 64 has not been detected by the decoder 23. Therefore, an AND-gate 26 is enabled to transmit an error signal to the file storage and control unit 12 when the decoder 21 detects completion of 71 circulations of the data-circulating register 15 before 64 correlations have been detected. The error signal then indicates to the file storage and control unit 12 that a format error has occurred, either in transferring the line of data into the data-circulating register 15 or in transferring the ASCII to video code converting dictionary to the circulating register 16. The file storage and control unit may then either repeat the operation or initiate a diagnostic routine. In either case, an error signal may be displayed at the keyboard unit 13 to call the operator's attention to the code conversion failure.

Following a successful code conversion the remaining ASCII code groups are erased before transferring the line of data to the cyclic storage display unit 11 in order to preserve the intercharacter space stroke in the displayed text, and to avoid interference with nonvideo data that the file storage and control unit 12 may require to be stored in the eight-bit positions of the intercharacter space stroke, such as a cursor or marker signal stored there as noted hereinbefore. That is accomplished by blanking or inhibiting the recirculation of binary digits read from the ASCII code positions of the characters just translated during one additional cycle of the register 15 before the translated data is transferred to the display storage unit 11.

Transfer of data from the cyclic display storage unit 11 to the file storage and control unit 12 is generally the reverse of that just described for the transfer of data from a file for display. The operation is initiated by an operator through the keyboard unit 13. The initial step is to load a video-to-ASCII conversion dictionary into the circulating register 16. The successive lines of data being displayed are then transferred to the data-circulating register 15 in succession until the line selected for transfer is found. That is generally accomplished by providing a marker in the line preceding the one to be transferred so that upon detection of the marker by the file storage and control unit 12, the next line transferred to the data circulating register 15 is trapped. The appropriate display line is then ready for code conversion.

The translation of data proceeds by comparing video codes while the number of recirculations of data in the register 15 and the number of correlations detected by the comparator 17 are counted by their respective counters 20 and 22. If the 64 translations are completed prior to 71 recirculations, the video data in the data circulating register 15 may be erased. If 71 circulations do not result in 64 translations, the translation process is not terminated through the AND-gate 25 and an error signal is transmitted through the AND-gate 26 instead, again to indicate that there has been a format error.

If translation has been successfully terminated, the video data is erased in one additional cycle of the register 15 by inserting a binary 1 into each bit position of the video character code groups. Consequently, at the end of that additional cycle, only the ASCII codes of the translated data remain in the data circulating register 15, each ASCII code group being separated from adjacent ASCII code groups by 40 successive binary 1's.

To store a line of data which has just been translated, it is necessary to align the ASCII code groups with the code group positions of the six possible pages of a file into which the line may be stored. That is so because the ASCII code of a given translated character is stored in the data-circulating register 15 in a position following its video code. Thus, as will be described more fully with reference to FIG. 5, the resulting ASCII code groups will be offset by at least one page position. For instance, if the line of data is to be stored in page 6, the line of translated data must be advanced one page position. That is accomplished by shortening the circulating register 15 by one ASCII code group length (eight-bit positions) for as many circulations as necessary to advance the data to the selected page position.

Once the ASCII code groups are in the proper page position, the assimilation of file data may proceed by first searching for the selected file line into which the data is to be transferred. When the selected file line is found, the lines of five unselected file pages are transferred into the circulating register 15, replacing the previously loaded binary 1's and leaving in place the ASCII code groups just obtained by video-to-data code conversion. This is readily accomplished by using the binary 1's stored in the 40-bit positions of the video code groups just translated to transfer ASCII code groups to the data-circulating register 15. Since binary 1's in each of eight-bit positions for an ASCII code group does not represent any one of 71 possible characters, a group of flip-flops external to the track on which the data-circulating register 15 is implemented are employed in advance of the recording heads to detect the binary 1's in each of the eight-bit positions and switch the recording head from the output of the external flip-flops to the file storage control unit to substitute an ASCII code group from the file storage unit 12 for the eight binary 1's detected.

After the unselected pages have been assimilated with the line of data just translated in the data-circulating register 15, a new search is made for the file line into which the data just translated is to be transferred, and when that file line is found, the assimilated data in the circulating register 15 is transferred directly.

The invention thus far described in its broadest aspects with reference to FIG. 1 will now be described in greater detail with reference to FIGS. 4 and 5. The latter shows data aligned in the circulating registers 15 and 16 for a video-to-ASCII code conversion while the former shows data aligned for ASCII-to-video code conversion.

File-to-Display Transfer

Figure 4:
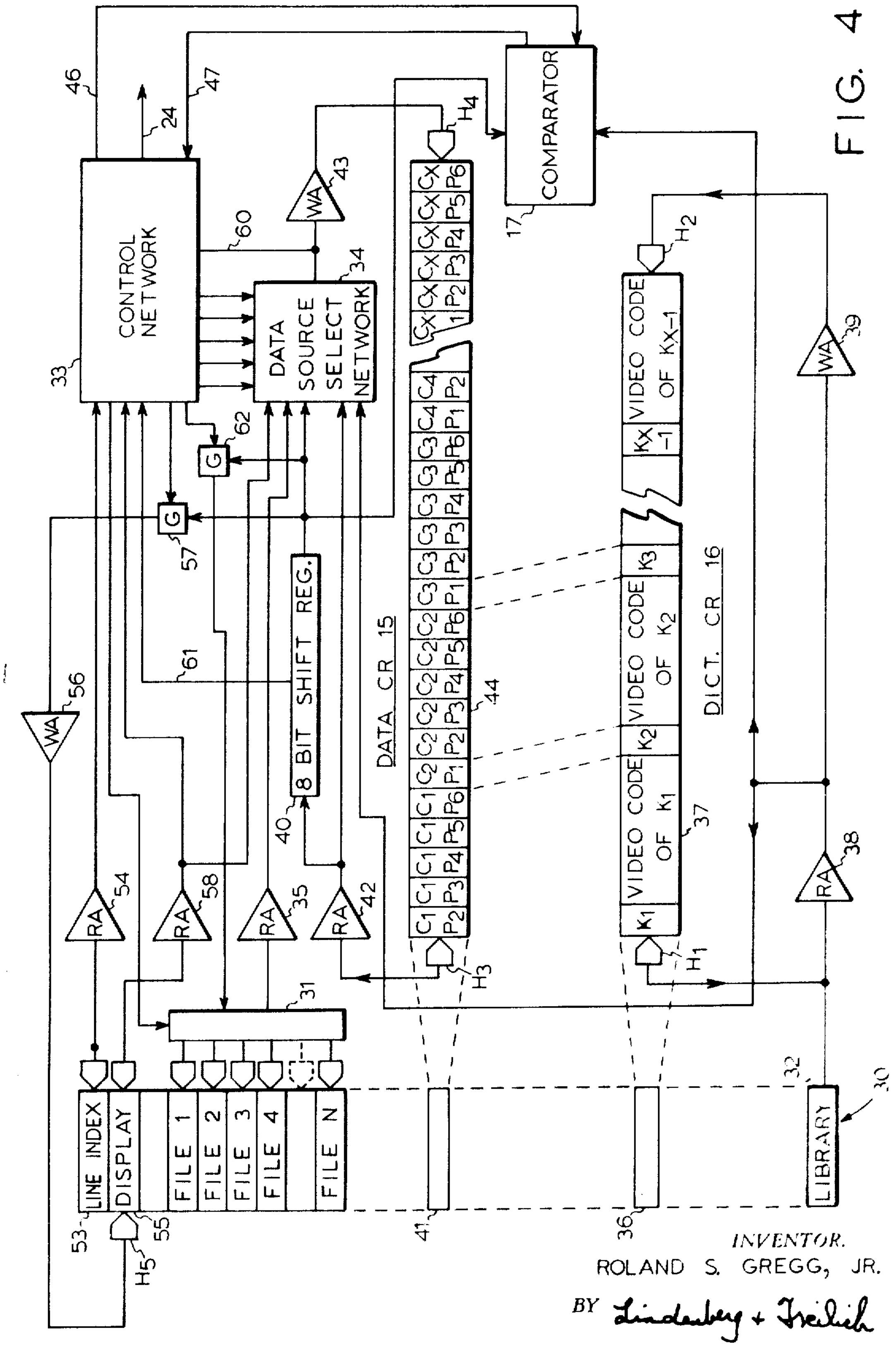
FIG. 4 is a schematic diagram illustrating the present invention with data aligned in circulating registers for operating in a data-to-video code converting mode.

Referring now to FIG. 4, a magnetic drum 30 is provided with a plurality of tracks for file storage such as files 1, 2, 3 and 4. Each file contains ASCII coded data of six pages in the interleaved fashion described with reference to FIG. 3, which is with the eight bits of the first character of the first page followed by the eight bits of the first character of the second page, and so on to the eight bits of the first character of the sixth page. Thereafter, the eight bits for the second character of the first page would appear under the read head followed by the second character of the second, third, fourth, fifth and sixth pages. The pattern is repeated until 6,480 eight-bit character codes are provided which is equal to six pages, each page consisting of 15 lines and each line having 64 characters plus eight blank character positions at the end. Thus, after the first line of each of six pages have been stored in an interleaved manner on one track, the second and successive lines of the same six pages are stored on the same track until a total of 15 lines for six pages are stored.

When an operator requests data transfer from a file, via the keyboard unit 13 (FIG. 1), to the CRT display unit 10, a file is located through a head-selecting network 31 (FIG. 4). Thereafter, the file storage and control unit 12 (FIG. 1) systematically controls the transfer of data, one line at a time if an entire page is to be transferred from the selected file to the CRT display unit 10. Each line requires code conversion which, for the purpose of this invention, is the same as if only one line has been designated for transfer. Accordingly, for the purpose of describing the present invention with reference to FIG. 4, only a single-line transfer operation will be considered. The transfer of a page is accomplished in the same manner, with the file storage and control unit 12 automatically selecting each of the 15 lines of the selected page for transfer.

The drum 30 also has a separate track 32 designated as the "library" in which all of the characters employed by the system are stored in both the ASCII code and the video code. Since a track on the drum may store 15 lines of 72 video characters, including beam retrace character spaces, and the maximum number of different characters that may be employed in this illustrative embodiment of the invention are 71 in number, the library can be duplicated 15 times. Each duplication may be denominated a dictionary because each code group in one format is followed by its corresponding code group in the other format.

In converting from the ASCII code to the video code in accordance with the present invention, it is necessary to read the ASCII code of each character first. On the other hand, when converting from the video code to the ASCII code, it is then necessary to read the video code of each character first. Therefore, it is necessary to retain in the library track 32 both types of dictionaries, one type with the ASCII code groups preceding the corresponding video code groups and the other type with the video code groups preceding the corresponding ASCII code groups. Both types of dictionaries are recorded on the library track alternately. The ASCII code conversion dictionary is recorded an odd number of times on odd lines, and the video to ASCII conversion dictionary an even number of times on even lines.

When it is desired to convert a line of data from a selected file to a video code for transfer to the cyclic display storage unit 11, an ASCII to video code conversion dictionary is read from an odd line of the library track 32 to the dictionary circulating register 16 comprising read and write heads $H_1$ and $H_2$, respectively, on a track 36 of the drum 30 shown schematically as a broken elongated block 37. Thereafter, the dictionary is recirculated through a read amplifier 38 and a write amplifier 39. The read and write heads $H_1$ and $H_2$ are spaced 71 video characters apart on the track 36 to provide storage for all 71 video codes, each preceded by its corresponding eight-bit ASCII code. For convenience, the characters in the elongated blocks 37 are identified as characters $K_1$, $K_2$, $K_3$ and so forth but it should be understood that the characters are symbols to be displayed, including blank spaces, letters of the alphabet, the Arabic numerals zero to nine, punctuation marks, and the like. The eight-bit ASCII code of each character precedes its corresponding video code which consists of 40 binary digits. Accordingly, each dictionary character space consists of 48-binary digits.

The line to be transferred to the cyclic display storage unit 11 (FIG. 1) is located in the designated file by a control network 33 employing normal drum addressing techniques and then read through a data source select network 34 via a read amplifier 35 into the data recirculating register 15 comprising a shift register 40, a track 41 of the drum 30, a read amplifier 42 and a write amplifier 43.

Read and write heads $H_3$ and $H_4$ are spaced eight-bit positions short of 72 video characters or 3,456-bit positions apart on the track 41 to provide recirculating storage for 72 characters in the eight-bit ASCII code for each of six pages as described with reference to FIG. 3. The remaining eight-bit positions required to store 3,456 binary digits are provided by the shift register 40. Therefore, when a line is selected for transfer from the file storage and control unit 12 to the cyclic storage display unit 11, five additional lines from other pages are also transferred to the circulating register 15. The video code spaces on the track 41 containing these lines from six different pages are represented in FIG. 4 by an elongated, broken block 44. Each eight-bit character code stored thereon is represented by the letter C with a subscript denoting its position in the line of its corresponding page. Its corresponding page is then designated by the letter P below it with a subscript. For example, the first eight-bit character of the second page is represented by $C_1$ over $P_2$. The corresponding first character of the first page is in the eight-bit shift register 40. Similarly, the second character of the first page is represented by $C_2$ over $P_1$ and the last eight-bit character is represented by $C_x$ over $P_6$, where $x$ is the number 72, for the last character in the line of the sixth page. However, it should be recalled that only the first 64 character positions of each line are employed to store data; the remaining eight character positions are unused but provided to facilitate system synchronization since the display data consists of 64 characters in a line followed by eight character positions not used for video data but rather for nonvideo control data, if desired, and read during line and frame retrace periods of the CRT.

If the line selected for transfer to the cyclic display storage unit 11 is from the first page, the ASCII character codes in the data-circulating register comprising the track 41 are in proper alignment for translation by comparison of the successive characters of the first page with the eight-bit codes ($K_1$, $K_2$, $K_3$ and so forth) in the recirculating register comprising the track 36 (where $K_1$, $K_2$, $K_3$ . . . $K_{x^-1}$ are the codes of 71 different characters). Accordingly, comparison proceeds as described with reference to FIG. 1. For example, the eight-bit code $K_1$ of the dictionary is compared with the first character $C_1$ of the first page $P_1$ as it is shifted out of the register 40. Following that, the eight-bit code $K_2$ is compared with the eight-bit code of the character $C_2$ of page $P_1$, and so forth, until the ASCII codes of the first 64 characters $K_1$ to $K_{64}$ in the dictionary have been compared with a corresponding number of characters in the line to be transferred. The comparator 17 is enabled to perform its function during those first 64 characters by the control network 33 via a line 46.

Implementation of the comparator 17 is straightforward. A simple exclusive OR logic network will perform the serial comparison such that the output of the network is true only if corresponding bits are not the same. A flip-flop, (reset at the beginning of each eight-bit code group to be compared) is then set by such a true signal. Once that flip-flop is set, the network 34 is not enabled (via control network 33) during the next 40 bit times to transfer a video code group to the circulating register 15.

The comparator 17 signals the control network 33 (via line 47) that a correlation has been found. The network 33 then actuates the data source select network 34 to switch the input terminal of the write amplifier 43 from the shift register 40 to the output of the read amplifier 38. Thus, the select network 34 performs the function of gate 18 of FIG. 1 to allow the video code of the character to be stored in the following 40-bit positions in the recirculating register comprising the track 41. For example, if the eight-bit ASCII code of the first character ($C_1$, $P_1$) is the same as the ASCII code for the first character ($K_1$) in the dictionary, the video code of the character $K_1$ in the dictionary read through the amplifier 38 is transmitted through the network 34 to the input of the write amplifier 43 in order that the video code of the character $K_1$ be stored in the 40 bit positions occupied by the ASCII codes for the first character of the successive pages ($C_1$ of pages $P_2$, $P_3$, $P_4$, $P_5$ and $P_6$).

Since the two circulating registers comprising the tracks 41 and 36 differ in length by one video character space (48-bit positions) the dictionary data will "precess" one video code space (48-bit positions) during each cycle of the longer circulating register, namely the circulating register 15 comprising the track 41. In that manner, within 71 circulations of the longer circulating register 15, all of the characters $K_1$ to $K_{71}$ in the dictionary will have been compared with each of 64 data characters to be converted. If not, an error signal is generated as described with reference to FIG. 1. If all 64 characters have been converted in less than 71 cycles of the circulating register 15, the converting process is terminated as described hereinbefore with reference to FIG. 1.

After the converting process has been terminated, the circulating register 15 comprising the track 41 will have the original characters in ASCII code stored therein, each with its corresponding video code following it. However, as noted with reference to FIG. 1, before the line of data may be transferred to the cyclic display storage unit 11, the remaining eight-bit ASCII code groups are erased. This is preferably done during one complete additional cycle of the register 15, but may be done as the line of data is being transferred out of the circulating register 15 to the cyclic display storage unit 11. To erase the ASCII code groups during one additional cycle, the comparator is disabled by the control network 33 via the line 46, and all data sources are cut off from the write amplifier 43 at the network 34 by the control network 33 during the appropriate times. It should be noted that the control network 33 is an integral part of the file storage and control unit 12, but shown in FIG. 4 for clarity.

Synchronous control for the erasing cycle is initiated by a pulse coupled to the network 33 from the line index track 53 by a read amplifier 54. A counter in the control network then counts the 48-bit positions of each video character group and disables all inputs to the write amplifier 43 for the eight-bit times corresponding to the sixth (intercharacter) stroke of each video character group. The bit-timing signals are derived from still another track (not shown) in a manner well known to those skilled in the art, and are used throughout the display storage unit 11 as well as the file storage and control unit 12.

If the line of data to be converted and transferred to the cyclic display storage unit 11 is not on the first page of the file trapped, it is necessary to position the line of the designated page in the first page position shown in FIG. 4, i.e., with the eight-bit codes even with the ASCII codes of characters $K_1$ to $K_{71}$ in the register 16. For example, if the line to be converted and transferred is from the fourth page, it is necessary to shift the data in the circulating register 15 relative to the dictionary in the register 16 until the first character ($C_1$ of page $P_4$) is in line with the eight-bit code of the first character $K_1$ in the recirculating register 16, i.e., until the first character is in the shift register 40 when the first character $K_1$ is in the position shown before conversion is initiated. That is accomplished by the control network 33 effectively shunting the shift register 40 for three successive cycles of the recirculating register 15. To do that, the control network 33 actuates the data source select network 34 to connect the output of the read amplifier directly to the input of the write amplifier the required number of complete circulation cycles.

The following table shows the number of cycles of the recirculating register 15 necessary for the control network 33 to be effective for selection of designated pages.

| Page | Cycles |
|---|---|
| 1 | 0 |
| 2 | 1 |
| 3 | 2 |
| 4 | 3 |
| 5 | 4 |
| 6 | 5 |

The control network 33 accomplishes this by counting the number of cycles of the circulating register 15, i.e., by counting line index pulses from the separate track 53 on the drum 30. When the appropriate number of cycles have been counted for a designated page, the designated page is in the proper position and translation from the ASCII code to the video code may proceed.

To assure that code conversion is not started until the selected page is in the proper position, control network 33 disables comparator as by a control signal via the line 46, until the shift 40 has been bypassed required of cycles. The comparator 17 is then enabled during the subsequent At the same time, signal transmitted over the line 24 (FIG. 1) to reset the counters and 22 and set flip-flops 1 and $F_2$.

Once code conversion of a line from a data file has been completed, and the remaining ASCII code groups have been erased, the control network 33 transfers the converted line of data to the display storage unit 11 of FIG. 1. That unit is represented in FIG. 4 as a track 55 having a recording head $H_5$ connected to the circulating register 15 by a write amplifier 56. A gate 57 is activated for that purpose by the control network 33 which, as noted hereinbefore, is part of the file storage and control network 12 of FIG. 1. Thus, it should be understood that the gate 57 as well as the flip-flops ($FF_1$-$FF_2$) and associated gates (25, 26) shown in FIG. 1 are, in practice, functionally part of the control network 33, but are shown separately for clearer understanding of the present invention.

Display-to-file transfer

Conversion of video code groups to ASCII code groups will now be described with reference to FIG. 4 for transfer of a line of data from the cyclic display storage unit 11 to the file storage and control unit 12 (FIG. 1). Initiation of a display-to-file transfer operation is by an operator through the keyboard 13. Although an entire page (15 lines) of display data may be transferred, the page transfer operation is the same as a sequence of line-transfer operations automatically initiated by the file storage and control unit 11 once the transfer operation is initiated. Since such automatic sequencing is normal in systems of this type, only the transfer of one line will be described. The operator may designate the line through the keyboard 13 by moving a marker to that line on the CRT display unit. The operator also designates the page and line of the file to which the data is to be transferred in the file storage and control unit 12. Once the designations are made, and the transfer operation is initiated by actuation of an appropriate transfer function key, the operation to be described is automatically carried out by the file storage and control unit 12.

The first step is to load the dictionary for video-to-ASCII translation from the library track 32 into the circulating register 16. Lines of data are then sequentially loaded into the data-circulating register 15 via read amplifier 58 from the display storage unit 11 represented in FIG. 4 by the display track 55. When the designated line is reached, that line is trapped in the circulating register 15 by the data source select network 34 which switches the write amplifier 43 to the shift register 40 under control of the network 33. The appropriate display line is then ready for code conversion prior to transfer to the file storage and control unit 12.

It should be noted that the steps of loading the circulating registers 15 and 16 are similar to the corresponding steps of a file-to-display transfer operation described hereinbefore. There the dictionary loaded into the register 16 was for ASCII-to-video code conversion. Accordingly, the ASCII code groups $K_1$, $K_2$...$K_{x-1}$ preceded the corresponding video code groups. Here the conversion is in the reverse so that the dictionary loaded into the register 16 has the video code groups preceding the ASCII code groups, as shown in FIG. 5. Otherwise, the same apparatus shown in FIG. 4 is employed, but in a slightly different manner.

The display data is read into the data circulating register 15 through a read head $H_6$. Thus, loading the register 15 is very much like in a file-to-display transfer operation. However, there the control network 33 locates the designated line by, for example, counting line index pulses, while here the same unit locates the line by searching for a line in the display track 55 having a marker.

In a system which has been successfully operated, the marker is stored in the form of a cursor signal in the sixth bit position of an intercharacter stroke, i.e., stroke 6 of a character as shown in FIG. 2. That cursor signal produces a blinking block in the following character position on the CRT screen, as described in a copending application Ser. No. 799,265, filed Feb. 14, 1969, now U.S. Pat. No. 3,603,966 and assigned to the assignee of the present invention. Accordingly, to search for the line to be transferred, the control network 33 looks for such a cursor signal in video code groups being shifted into the register 15 through the amplifier 58. When the cursor signal is found, the control network 33 switches the input of the write amplifier 43 to the shift register 40, but not until the last video code group of the line being read has been shifted into the registered 40. In contrast, for a file-to-display transfer, the control network 33 switches to the shift register 40 automatically when the control network 33 has counted a predetermined number of line index pulses starting from a given point designated by a primary index pulse (on a track not shown) used for synchronizing all drum operations in the usual manner.

Figure 5:
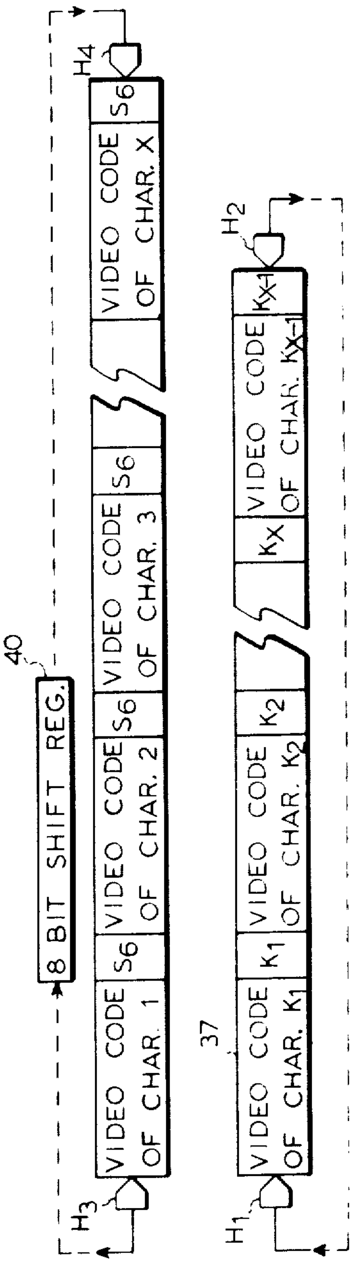
FIG. 5 is a schematic diagram illustrating the alignment of data in the circulating registers of FIG. 4 while operating in a video-to-data code converting mode.

The video code groups trapped in the circulating register 15 are initially aligned with the video code of the first character opposite the video code of character $K_1$ in the dictionary circulating register 16 as shown in FIG. 5, but with the first eight-bits in the shift register 40. The sixth stroke of each character in the register 15 (shown as $S_6$, and comprising eight binary digits) is then compared with an ASCII code group of eight binary digits. Operation of the comparator is the same as for a file-to-display transfer, except that 40 bits of each 48-bit video character group is compared.

At the time the control network 33 functions to trap a line of data from the display track 55 in the register 15, it also functions to enable the comparator 17. The translation of data in the register 15 proceeds while the number of circulations and correlations are counted by counters 20 and 22 (FIG. 2), just as in the reverse transfer. However, in this case, each correlation found by the comparator 17 between 40-bit words in the two registers 15 and 16 results in switching the input of the write amplifier 43 of FIG. 4 to the output of the read amplifier 38 for eight successive bit times to transfer the following ASCII code group from the circulating register 16 into the corresponding eight-bit positions of a sixth stroke ($S_6$) in the register 15.

As in the file-to-display transfer, if 64 correlations are counted prior to 71 circulations, the converting operation is terminated via gate 25 (FIG. 1), which is included in FIG. 4 as part of the control network 33. If 71 circulations of the data in register 15 do not result in 64 correlations, the transfer operation is terminated via gate 26 and a format error indication is sent to the keyboard unit 13 by the control unit 33 as described with reference to FIG. 1.

If code conversion has been successfully completed, the next step is to erase the video code groups in the register 15. However, instead of writing a binary 0 in each video code bit position, that is accomplished by the control network 33 overriding the output of the shift register 40 via a line 60 to insert a binary 1 in each of those bit positions during the following circulation of the register 15. At the end of that step, only the converted ASCII codes remain in the register 15 in the page positions shown as $S_6$ in FIG. 5. All other bit positions are then storing a binary 1.

Before the line of data in ASCII code may be transferred to the designated page file, it must be aligned with the proper page. This alignment is executed by shortening the circulating register 15 by one ASCII code group length for as many circulations as necessary to advance the data to the designated page position under control of the network 45 in a manner similar to the initialization of a file-to-display transfer by switching the input to the write amplifier 43 directly to the output of the read amplifier 42 for as many cycles of the recirculating register 15 as necessary in accordance with the following table:

| Designated Page | Cycles |
|---|---|
| 1 | 6 |
| 2 | 5 |
| 3 | 4 |
| 4 | 3 |
| 5 | 2 |
| 6 | 1 |

After the completion of the necessary cycles, the ASCII code groups are in proper page position for assimilation with a specified line of data from the designated file. The designated file is then connected to the read amplifier 35 by the head select network 31 under control of the network 33.

The file storage and control unit 12 initiates a search for the designated line of the file and when it is found by counting line index pulses, the control network 33 thereof switches the input of the write amplifier 43 to the output of the read amplifier 35 to read the designated line data into the register, but only for each eight-bit group containing all ones. That is accomplished by the control network detecting all ones in the shift register 40 (via a sampling cable 61 of eight lines), and in response thereto enabling the network 34 to select the next eight bits from the designated file via read amplifier 35 instead of the shift register 40. Meantime, the next eight bits of the circulating register 15 are read into the shift register 40 through head $H_5$. If they are also all ones, the control network 33 again actuates the data source select network 34 to connect the read amplifier 35 to the write amplifier 42 for another eight bits to be stored in the register 15 from the designated file.

As noted hereinbefore, the data in the circulating register 15 was shifted for proper alignment before assimilating data therein from other pages in he file designated to receive the translated data. That was for the purpose of being able to examine each successive page (groups of eight bits) in the register 40, and if all ones, to read into the register 15 the data from the corresponding page and line of the designated file. Thereafter, when the assimilated data is transferred to the file track, the data is in the position it would have occupied if it has been read from there in the assimilated form. Thus, once the data translated has been assimilated in the register 15 with data from the file and line designated by the operator through the keyboard 13, the data in the register 15 is transferred to the designated line in the selected file, thereby completing a transfer to the file storage and control unit 12. That is accomplished by the control network 33 enabling a gate 62 to connect the output of the shift register 40 to the same head selected by the network 31 for the assimilation process. In that manner a single head is used for both reading and writing in a given file of the storage unit 11 of FIG. 1.

In practice, the gate 62 is not connected to the last stage of the register 40, but to an earlier stage. That is for the purpose of compensating for a finite delay in the recording circuits between the gate 62 and the selected head. That and other standard techniques may be employed throughout to achieve proper synchronization between the display storage unit 11 and the file storage and control unit 12, a task made easier by employing a single-rotating drum or disc for all memory tracks.

If the transfer is for an entire page (15 lines of data on display), as each transfer of a line to a selected file is completed, the marker is advanced to the next line in the display storage unit 11 of FIG. 1 and the transfer operation is automatically repeated for the next line by the file storage and control unit 12. The sequence is repeated fifteen times to complete the page transfer.

While the principles of the invention have now been made clear in an illustrative arrangement, there will be immediately obvious to those skilled in the art other arrangements which may be used in the practice of the invention in specific environments to satisfy particular operating requirements. The following claims are therefore intended to cover and embrace any such modifications, within the limits only of the true spirit and scope of the invention.

The embodiments of the invention in which an exclusive property or privilege is claimed are defined as follows:

1. In a system for transferring binary coded data between a cyclic display storage unit and a file storage unit of a CRT data display system wherein data is stored in said file storage unit in one code, which may be referred to as a system code, and in said cyclic display storage unit in another code, which may be referred to as a video code, and wherein a line of data in said display storage unit includes a group of binary digits between video code groups read while an intercharacter space is being produced on the CRT, the method of converting a line of data from said system code to said video code for display of a predetermined number of characters, comprising;

recirculating in a data register a line of data to be transferred to said display storage unit from said file storage unit with spacing between system code groups that define characters, said spacing being sufficient to receive a related video code group, and recirculating in a dictionary register a plurality of system code groups one group for each of all possible characters each system code group followed by its related video code group;

comparing each system code group in said data register with a system code group in said dictionary register during each cycle of the data register, and in response to each correlation, reading the following video code group from said dictionary register into said data register in the space following; and shifting data in said dictionary register relative to data in said data register after each cycle of said data register so that, during the next cycle, each system code group in said data register is compared with a different system code group in said dictionary register.

2. The method of claim 1 further comprising the technique of counting the number of correlations found, and when the number counted reaches the predetermined number of display characters in a line of data to be transferred, terminating the code conversion process and transferring the converted line of data to said display storage unit.

3. The method of claim 1 further comprising the technique of erasing the system data code groups in the line of converted data transferred from said data register to said display storage unit, whereby unit positions just erased in the stream of video code groups functions as intercharacter space groups of binary digits.

4. The method of claim 2 further comprising the technique of counting the number of cycles of said conversion process, and indicating an error if the number of correlations found do not equal the number of display characters in a line of data before the number of cycles counted is equal to the number of video code groups stored in said dictionary register.

5. In a system for transferring binary coded data between a cyclic display storage unit and a file storage unit of a CRT data display system wherein data is stored in said file storage unit in one code, which may be referred to as a system code, and in said cyclic display storage unit in another code, which may be referred to as a video code, and wherein data in said display storage unit includes a group of binary digits between video code groups read while an intercharacter space is being produced on the CRT, the method of converting a line of a predetermined number of display characters from said video code to said system code comprising:

recirculating in a data register a line of data to be transferred to said file storage unit from said display storage unit together with said intercharacter space group of binary digits between video code groups that define characters, and recirculating in a dictionary register, a plurality of video code groups, one group for each of all possible display characters, each video code group followed by its related system code group;

comparing each video code group in said data register with a video code group in said dictionary register during each cycle of the data register, and in response to each correlation, reading the following system code group from said dictionary register into said data register in the space following; and shifting data in said dictionary register relative to data in said data register after each cycle of said data register so that during the next cycle each video code group in said data register is compared with a different video code group in said dictionary register.

6. The method of claim 5 further comprising the technique of counting the number of correlations found, and when the number counted reaches the number of display characters in a line of data to be transferred, terminating the code conversion process and transferring the converted line of data to said file storage unit.

7. The method of claim 6 wherein said file storage unit comprises a track of a rotating record medium and data of a plurality of lines is stored therein in an interleaved manner such that the system data group of the first character of each of said lines are in sequence followed by the system data group of the second character of each of said lines in sequence, and so forth, said method including the process for transferring converted data to said file storage unit comprising the steps of selecting the line into which transfer is to be made by shifting the converted data into a position corresponding thereto in said data register, transferring from said file storage unit data from unselected lines into spaces between system data codes stored in said data register as a result of code conversion, and then transferring back to said file storage unit the contents of said data register.

8. The method of claim 7 wherein said file storage unit data is transferred into spaces between system data codes stored in said data register as a result of code conversion by first filling said spaces with a binary 1 in each binary digit position thereof, and then detecting groups of said digit positions in sequence, each group having a number of digit positions equal to the number of binary digits in a system code group, and substituting a system code group in said data register in place of each group of ones detected as said file storage unit is read in synchronism with recirculation of data in said data register.

9. In a CRT data display system having a cyclic display storage unit for storing at least one line of characters to be displayed and a file storage unit for storing a plurality of lines of characters, the latter storing each character in the form of a group of digital signals in a given system data code and the former storing each character in the form of a group of digital signals in a different video display code, each video code group followed by bit positions read from said display storage unit while a blank intercharacter space is being provided by said system as video code groups are cyclically read in sequence for continual regeneration of the display of said line of data, said intercharacter space bit positions being at least equal to the number of binary digits required to define a character in said systems data code, apparatus for transferring a line of data from said file storage unit to said display storage unit comprising:

a first recirculating register adapted to receive said line of data from said file storage unit with adjacent system code groups separated by a sufficient number of bit positions to store a related video code group for the preceding system code group such that for a line of given number of characters to be displaced, said first recirculating register stores said given number of system data code groups so spaced as to allow a corresponding number of video display code groups to be stored therein, one video display code adjacent to its corresponding system data code group;

a second recirculating register, different in length than said first recirculating register, by a number of binary digit positions equal the number of binary digit positions in a video code group plus a number of bit positions in a data code group, said second recirculating register being adapted to store a dictionary of all system characters, each set forth in a system data code group followed by a related video display code group;

comparing means connected to said first and second recirculating registers for comparing in sequence said system data code groups in said first recirculating register with system code groups for all possible characters in said second recirculating register; and means connected to said second recirculating register, said first recirculating register, and to said comparing means, for transmitting from said second register to said first register the following video code group for storage therein in a position just following its related system data code group under control of said comparator when correlation is found between a data system code group in said first recirculating register and a data system code group in said second recirculating register, whereby a line of data in said first register is converted from said system data code to said video display code for transfer to said cyclic display storage unit.

10. Apparatus as defined in claim 9 including first means for counting each correlation found by said comparator in order to know when conversion has been completed.

11. Apparatus as defined in claim 10 including:

a second means for counting the number of cycles of the longest of said first and second recirculating registers; and format error detecting means connected to said first and second counting means for determining when there have not been said given number of correlations found by said comparing means by the time the longest of said first and second registers has completed one less than a number of cycles equal to the total number of binary digit positions of storage contained therein divided by the number of binary digit positions by which it is longer than the other recirculating register.

12. Apparatus as defined in claim 11 wherein said first recirculating register is the longest.

13. Apparatus as defined in claim 11 wherein a number P of lines of data are stored in said file storage unit in an interleaved manner such that the first characters of all P lines are stored in sequence followed by the second characters of all P lines, and so forth to the last characters of all P lines, each character being set forth by a system code group, the number P being an integer which when multiplied by the number of binary digits in a system code group yields a product equal to the number of binary digit positions required to store one video code group plus said intercharacter space bit positions, and including means for transferring all P lines in interleaved order to said first register, and means for selecting the line to be converted for transfer to said display unit by shifting it into a position for comparison with the system code groups in said second register as said first and second registers are synchronously recirculated.

14. In a CRT data display system having a cyclic display storage unit for storing at least one line of characters to be displayed and a file storage unit for storing a plurality of lines of characters, the latter storing each character in the form of a group of digital signals in a given system data code and the former storing each character in the form of a group of digital signals in a given system data codes and the former storing each character in the form of a group of digital signals in a different video display code each video code group followed by bit positions read from said display storage unit while a blank intercharacter space is being provided by said system as video code groups are cyclically read in sequence for continual regeneration of the display of said line of data, said intercharacter space bit positions being at least equal to the number of binary digits required to define a character in said system data code, apparatus for transferring a line of data from said display storage unit to said file storage unit comprising:

a first recirculating register adapted to receive a line of a given number of characters in video code from said display storage unit and to store it therein with each video code group followed by said intercharacter space bit positions;

a second recirculating register, different in length than said first recirculating register by a number of binary digit positions equal to the number of binary digit positions in a video code group plus a number of binary digit positions in a system code group, said second recirculating register being adapted to store a dictionary of all system characters, each character being represented by a video code group followed by a related system code group;

comparing means connected to said first and second recirculating registers for comparing in sequence said video code groups in said first recirculating register with video code groups for all possible characters in said second recirculating register; and means connected to said second recirculating register, said first recirculating register, and to said comparing means, for transmitting from said second register to said first recirculating register the following system code group for storage therein in a position just following its related video code group under control of said comparator when correlation is found between a video code group in said first recirculating register and a video code group in said second recirculating register, whereby a line of data in said second register is converted from said video display code to said system data code for transfer to said cyclic display storage unit.

15. Apparatus as defined in claim 14 including first means for counting each correlation found by said comparator in order to know when conversion has been completed.

16. Apparatus as defined in claim 15 including:

a second means for counting the number of cycles of the longest of said first and second recirculating registers; and format error detecting means connected to said first and second counting means for determining when there have not been said given number of correlations found by said comparing means by the time the longest of said first and second recirculating registers has completed one less than a number of cycles equal to he total number of binary digit positions of storage contained therein divided by the binary digit positions by which it is longer than the other recirculating register.

17. Apparatus as defined in claim 16 wherein said first recirculating register is the longest.

18. Apparatus as defined in claim 16 wherein a number P of lines of data are stored in said file storage unit in an interleaved manner such that the first characters of all lines are stored in sequence followed by the second characters of all lines, and so forth, to the last characters of all lines, each character being set represented by a system code group, the number P being an integer which when multiplied by the number of binary digits in a system code group yields a product equal to the number of bit positions required to store one video display code group plus said intercharacter space bit positions, and including means for selecting the line into which said converted data is to be transferred in said file storage unit by shifting it into a position corresponding thereto in said first register before transferring said converted data into said file storage unit.

19. Apparatus as defined in claim 18 wherein once the code conversion has been completed for a display to file transfer, the video code groups are replaced by data from said file storage unit before transferring the contents of said first recirculating register into said file storage unit, said data comprising all lines of data in said file storage unit except the line selected to receive said line of converted data.

20. Apparatus as defined in claim 19 wherein said video code groups are first replaced by like binary digits in each bit position thereof in said first register, and including means for detecting groups of such like binary digits in positions into which data from said file storage unit are to be transferred, and means responsive to said detecting means for effecting the transfer of said data to said positions whereby system data code groups of different lines in said file storage unit replace each of said video display code groups in said first recirculating register before data from said first recirculating register is transferred into said file storage unit.

* * * * *